2,840,608

PREPARATION OF 4-KETOOCTANEDIOIC ACIDS BY HYDROGENATING CERTAIN DILACTONES WITH A PALLADIUM CATALYST

Robert James Crawford, Urbana, Ill., and Vaughn A. Engelhardt, Claymont, and Howard E. Holmquist, Wilmington, Del., assignors to E. I. du Pont de Nemours and Company, Wilmington, Del., a corporation of Delaware No Drawing. Application August 28, 1956
Serial No. 606,561

8 Claims. (Cl. 260—537)

This invention relates to a new method for preparing keto acids containing a long chain. More particularly this invention relates to a novel catalytic hydrogenation process for converting certain dilactones into long chain keto dicarboxylic acids.

Octanedioic acid is produced when the dilactone obtained by reacting acetylene with carbon monoxide over a cobalt carbonyl catalyst, as disclosed and claimed in the copending application of J. C. Sauer, Ser. No. 549,155, filed November 25, 1955, is treated with hydrogen in the presence of platinum in acetic acid. When the hydrogenation is effected with palladium in a neutral medium, the product is tetrahydro-[2,2'-bifuran]-5,5'(2H,2'H)dione.

It is an object of this invention to provide a new method for preparing long chain keto dibasic acids. A further object is to provide a novel catalytic hydrogenation process for converting certain dilactones into long chain keto dicarboxylic acids. An important object is to provide a new and improved process for preparing 4-ketooctanedioic acids. Another object is to provide a new method for preparing 4-ketooctanedioic acids in two steps, starting with abundantly available, low cost carbon monoxide and acetylenic compounds, such as acetylene. Other objects will appear hereinafter.

These and other objects of this invention are accomplished by the following process for preparing 4-ketooctanedioic acids which comprises reacting hydrogen and a dilactone having in its ultraviolet spectrum a strong absorption line in the region 3300 to 4400Å and of the general formula $C_8(RR')_2O_4$ in which R and R' are hydrogen, haloaryl, alkoxaryl or monovalent hydrocarbon radicals free from non-aromatic unsaturation in a medium having a pH less than 2 and in the presence of a palladium catalyst. It has now been found that when the dilactone conforming in molecular formula to $C_8H_4O_4$, $[\Delta^{2,2'(5H,5'H)}$-bifuran]-5,5'-dione, is hydrogenated with palladium in the presence of a strong acid having a pH less than 2 the product is 4-ketooctanedioic acid, i. e., 4-ketosuberic acid. The dilactones employed in the process of this invention are obtained by reacting an acetylenic compound, such as acetylene, with carbon monoxide over a cobalt carbonyl catalyst as disclosed and claimed in said copending patent application of J. C. Sauer, Ser. No. 549,155.

In a convenient way of carrying out the process of this invention, a pressure reactor is charged with dilactone, e. g., $[\Delta^{2,2'(5H,5'H)}$-bifuran]-5,5'-dione, acetic acid, and at least 1%, based on the weight of dilactone, of a palladium catalyst. To this mixture there is added enough concentrated hydrochloric acid to reduce the pH to below 2 and hydrogen is then introduced at room temperature in amount sufficient to provide at least 5 mole equivalents per mole of dilactone. The temperature of the system is maintained between 20 and 40° C. After reaction is complete, as evidenced by cessation of pressure drop, the reactor is opened, excess hydrogen vented to the atmosphere, and the contents discharged and filtered. The filtrate is then vacuum-distilled or evaporated to remove the acetic and hydrochloric acids. The solid residue is recrystallized from water to yield almost pure 4-ketooctanedioic acid.

The examples which follow are submitted to illustrate and not to limit this invention.

Example I

A slurry of 25 g. of the dilactone, $[\Delta^{2,2'(5H,5'H)}$-bifuran]-5,5'-dione, prepared as described subsequently, with 4 ml. of concentrated hydrochloric acid and 2.5 g. of 10% palladium-on-charcoal catalyst in 200 ml. of glacial acetic acid was reduced in a Parr hydrogenation flask at room temperature. The system absorbed the theoretical amount of hydrogen. When the solvent was distilled from the filtered reaction product, the residual material crystallized upon cooling. This material was then recrystallized from chloroform to yield 10 g. of a solid compound melting at 128–130° C. The compound after three recrystallizations from water melted at 135–137° C. It was acidic to sodium bicarbonate solution.

Analysis.—Calc'd. for $C_8H_{12}O_5$: C, 51.05; H, 6.43; M. W., 188. Found: C, 51.06; H, 6.43; N. E., 98.6, 98.3.

Infrared analysis: 3.4μ (saturated C–H), 5.85μ (ketone carbonyl), 10.9μ (carboxylic acid).

A semicarbazone was obtained from the 4-ketooctanedioic acid (0.90 g.), described above, semicarbazide hydrochloride (0.54 g.), sodium acetate (0.75 g.), and water (10 ml.). The solid weighed 0.91 g. and melted at 146° C., after two recrystallizations from ethanol.

Analysis.—Calc'd. for $C_9H_{15}O_5N_3$: C, 44.07; H, 6.30; N, 17.14. Found: C, 43.82; H, 6.35; N, 17.02, 17.10.

Example II

The dilactone of Example I (25 g.), acetic acid (270 ml.), concentrated hydrochloric acid (30 ml.), and 10% palladium-on-carbon catalyst (1.6 g.) was shaken with hydrogen at room temperature at a maximum pressure of 45 lb./sq. in. until absorption ceased. The product was filtered and evaporated to dryness to give a solid acid, 13.4 g. in crystalline form and an additional 7.3 g. as a tacky solid; total yield 72%. After recrystallization from ethyl acetate, chloroform, or water the 4-ketooctanedioic acid melted at 132–133° C. and did not depress the melting point of the sample described in Example I.

The unsaturated dilactone $[\Delta^{2,2'(5H,5'H)}$-bifuran]-5,5'-dione used in the examples was prepared by charging into a steel pressure reactor of 400 cc. capacity 26 g. of acetylene, 200 ml. of acetone, and 1.5 g. of dicobalt octacarbonyl. The mixture was heated with carbon monoxide at a pressure of 1000 atmospheres for 14 to 17 hours. The product was filtered and the brown solid was extracted with ethyl acetate for 24 hours. The extract was permitted to crystallize and the crystalline material was separated, and dried at room temperature. There was obtained 20 g. of the unsaturated dilactone, $C_8H_4O_4$, M. P. 229° C. after several recrystallizations from acetic acid.

The $[\Delta^{2,2'(5H,5'H)}$-bifuran]-5,5'-dione exists in the form of two structural isomers, which yield octanedioic acid (suberic acid) when hydrogenated with platinum in acetic acid. The normal or low melting form, 230–237° C. is the trans form and the high melting form, 240–248°

C. is the cis form. The formulae of these structural isomers of [Δ²,²'(5H,5'H)-bifuran]-5,5'-dione are as follows:

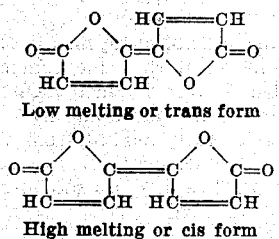

Low melting or trans form

High melting or cis form

These structural isomers of [Δ²,²'(5H,5'H)-bifruan]-5,5' dione can be represented by the structural formula

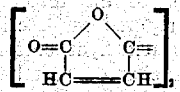

Both of these structural isomers yield 4-ketooctanedioic acid by the proces of this invention.

Although the hydrogenation of the [Δ²,²'(5H,5'H)-bifuran]-5,5'-dione to 4-ketooctanedioic acid has been effected batchwise, it is to be understood that this is only for convenience and that it can be carried out as a continuous or semi-continuous up-flow, down-flow, co-current, or counter-current vapor or liquid phase operation, with recovery of unconverted reactants for recycling.

The hydrogenation of the [Δ²,²'(5H,5'H)-bifuran]-5,5'-dione is effected with a palladium catalyst at pressures which may range from atmospheric up to 3000 lb./sq. in. or more. As a rule, pressures below 1000 lb./sq. in. are used because the reaction takes place at a practical rate with favorable yields of desired product under these conditions.

The particular temperature used is controlled by the nature and activity of the palladium catalyst. With palladium-on-carbon, the reaction proceeds satisfactorily at 20° C. However, higher temperatures up to 40° C. can be used but since no practical advantages accrue from the use of temperatures above 20° C. the range of 20-25° C. embraces the temperature conditions generally used.

The amount of catalyst is at least 0.10% by weight of the [Δ²,²'(5H,5'H)-bifuran]-5,5'-dione. Since the rate of hydrogenation is improved by increasing the catalyst concentration, usually an amount is employed which is in the range of 0.5 to 10% by weight of the [Δ²,²'(5H,5'H)-bifuran]-5,5'-dione being hydrogenated.

Any active palladium catalyst can be used. Thus, there can be used palladium or any of its compounds, e. g., the oxide, chloride, nitrate, etc., and the catalyst can be unsupported or supported on inert base materials. Compounds of palladium appear to be more or less completely reduced to palladium metal during use. Suitable supports are charcoal, pumice, silica, etc. The particle size of the support can vary from 40-300 mesh for use in fluidized systems, whereas for use in fixed-bed systems supports of larger particle size, e. g., 4-40 mesh are satisfactory.

A suitable palladium catalyst is prepared by depositing palladium chloride on granular, activated, coconut charcoal, in amount sufficient to give a concentration of 0.2 to 20 g. of palladium per liter of catalyst. Preferably the charcoal is subjected to treatment with an acid, such as nitric acid, prior to contacting it with the palladium compound. A typical preparation is the following:

A solution of 8.33 g. of palladium chloride in 5.5 ml. of concentrated hydrochloric acid and 40 ml. of water is prepared by heating the mixture on a steam bath. The resulting solution is poured into a solution of 135 g. of sodium acetate trihydrate in 500 ml. of water contained in a one-liter reduction bottle. Forty-five grams of activated coconut charcoal is added and the mixture is hydrogenated until hydrogen absorption ceases, which is between 1 and 2 hours. The catalyst is collected on a suction filter and worked with 2 liters of water in five portions. The filter cake, after removal of most of the water, is dried in air and stored in a desiccator over calcium chloride. The catalyst, which weighs from 40 to 50 g. and contains about 10% palladium, is stored, after being powdered, in a tightly closed container.

The pH of the medium in which the hydrogenation is effected is critical. Thus, in acetic acid alone which has a pH of 2.4 the product of the hydrogenation is 1,8-octanedioic acid. Addition of a strong acid such as hydrochloric acid, to reduce the pH to below 2 causes the reaction to take a different course and the product is a 4-ketooctanedioic acid. Hydrochloric acid is the preferred acid because it is low in cost and because it seems to have an activating effect on the palladium catalyst. It is to be understood, however, that other strong acids such as sulfuric, hydrobromic, etc., can be used in place of hydrochloric but they offer no advantage over hydrochloric and are less preferred.

The process of this invention is generally applicable to any of the dilactones obtained by reacting an acetylene with carbon monoxide in the presence of a cobalt carbonyl catalyst, as disclosed and claimed in the copending application of J. C. Sauer, U. S. Ser. No. 549,155, filed November 25, 1955.

The cobalt carbonyl may be made directly by reaction of carbon monoxide with the metal in active form as described in J. Am. Chem. Soc. 70, 383-6 (1948).

The acetylenes used in preparing these dilactones correspond to R—C≡C—R', in which R and R' are hydrogen, alkoxyaryl, especially where the alkoxy group is of not more than 12 carbon atoms and the aryl radical is hydrocarbon of no more than 10 carbon atoms; haloaryl, especially chloroaryl where the aryl radical is hydrocarbon of not more than 10 carbon atoms, or monovalent hydrocarbon radicals free from non-aromatic unsaturation, especially of not more than 12 carbon atoms, e. g., alkyl, especially short chain alkyl, i. e., containing not more than 7 carbon atoms, aryl, especially where the aryl radical is hydrocarbon of not more than 10 carbon atoms, dialkyl, especially of not more than 7 carbon atoms, or cycloalkyl, particularly of not more than 7 carbon atoms. Examples of such radicals are methyl, ethyl, octyl, decyl, dodecyl, phenyl, tolyl, xylyl, naphthyl, benzoyl, cyclohexyl, methyl cyclohexyl, chlorophenyl, methoxyphenyl, ethoxyphenyl, decylphenyl, dodecyloxyphenyl, dodecyloxynaphthyl, and the like. Examples of such acetylenes are acetylene, methylacetylene, 2-decyne, phenylacetylene, naphthylacetylene, p-chlorophenylacetylene, p-ethoxyphenylacetylene, p-decyloxyphenylacetylene, benzylacetylene, cyclohexylacetylene, methylcyclohexylacetylene, and the like.

By employing such substituted acetylenes there are obtained dilactones corresponding in molecular formula to $C_8(RR')_2O_4$, the radicals R and R' corresponding to the substituents attached to the triply bonded carbon in the acetylene reactant, i. e., R and R' in R—C≡C—R'. Thus, as shown by the aforementioned Sauer application there are prepared the following dilactones:

[Δ²,²'(5H,5'H)-biphenylfuran]-5,5'-dione
[Δ²,²'(5H,5'H)-bidiethylfuran]-5,5'-dione
[Δ²,²'(5H,5'H)-bi-n-butylfuran]-5,5'-dione
[Δ²,²'(5H,5'H)-bi-β-naphthylfuran]-5,5'-dione
[Δ²,²'(5H,5'H)-bi-o-methoxyphenylfuran]-5,5'-dione
[Δ²,²'(5H,5'H)-bichlorophenylfuran]-5,5'-dione and the like.

The reaction between the acetylene and carbon monoxide is carried out batchwise or continuously in the presence of an inert organic liquid medium. By "inert organic liquid medium" is meant organic liquids which contain no active hydrogen, as defined by S. Siggia in his "Quantitative Organic Analysis Via Functional Groups," 2nd ed. (1954), p. 78, chapter 7, and as determined by the Zerewitinoff method, Ber. 40, 2026 (1907); J. Am. Chem. Soc. 39, 3181 (1927). Thus, the acetylene is the only compound in the reaction system which may contain active hydrogen. Specific organic reaction media are isooctane, toluene, acetonitrile, acetone, ethyl acetate, dioxane, cyclohexanone, xylene, benzene, and the like.

The unsaturated dilactones can be represented by the general formula

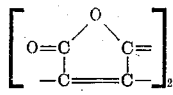

where one of the ring doubly bonded carbon atoms has its free valence satisfied by R and the other of the ring doubly bonded carbon atoms has its free valence satisfied by R', with R and R' being defined as aforesaid with respect to the acetylenic reactants. These unsaturated dilactones exist in two isomeric forms which can be represented by the general formulae:

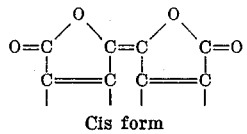

Cis form and

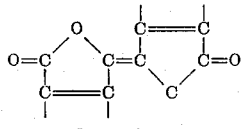

Trans form wherein one free valence of each ring is satisfied by R and the other free valence of each ring is satisfied by R', said R and R' being defined as previously indicated.

Substitution of the hereinbefore listed dilactones for the [Δ$^{2,2'(5H,5'H)}$-bifuran]-5,5'-dione of Example I in the process of Example I leads to the obtainment of the corresponding substituted 4-keto-octanedioic acids.

The 4-ketooctanedioic acids are valuable intermediates for condensation polymers, such as polyamides and polyesters, as shown below:

EXAMPLE A

A reactor was charged with 0.49 g. of 4-ketooctanedioic acid and 0.30 g. of hexamethylenediamine, evacuated, and sealed. The reaction mixture was then heated for one hour at 200° C., the reactor allowed to cool, and opened. There was obtained a translucent, pliable polymer which was useful as a coating material for rigid and flexible substrates. The polymer was insoluble in such organic solvents as acetone and dimethylformamide.

EXAMPLE B

A reactor was charged with 0.25 g. of 4-ketooctanedioic acid and 0.14 g. of 1,4-butanediol, evacuated, and sealed. The reaction mixture was heated for one hour at 200° C., the reactor was opened, and the heating continued at 235° to 240° C. for 1.5 hours longer. The reactor was allowed to cool and the contents removed. The product was a tacky polymer useful as an adhesive. It had a molecular weight of 720, 730 and was soluble in acetone.

Since these compositions contain the oxo group originally present in the acid, they can be further modified by reaction with carbonyl group reactive compounds, such as aldehydes, alcohols, etc. The 4-ketooctanedioic acids can also be reduced chemically or catalytically to 1,4,8-octanetriols, which are also valuable intermediates for polyesters.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. Process for preparing 4-ketooctanedioic acids which comprises reacting hydrogen, in an acidic medium having a pH less than 2 and in contact with a palladium catalyst, with a dilactone having the general formula

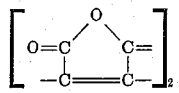

wherein one of the ring doubly bonded carbon atoms has its free valence satisfied by R and the other of the ring doubly bonded carbon atoms has its free valence satisfied by R', said R and R' being selected from the class consisting of hydrogen, alkoxyaryl where the alkoxy radical is not more than 12 carbon atoms and the aryl radical is hydrocarbon of not more than 10 carbon atoms, haloaryl where the aryl radical is hydrocarbon of not more than 10 carbon atoms, and monovalent hydrocarbon radicals, free from non-aromatic unsaturation, of not more than 12 carbon atoms.

2. Process for preparing 4-ketooctanedioic acids as set forth in claim 1 wherein said acidic medium having a pH less than 2 contains concentrated hydrochloric acid.

3. Process for preparing 4-ketosuberic acid which comprises hydrogenating, at a temperature of 20 to 40° C. under a hydrogen pressure within the range of atmospheric to 3000 lbs./sq. in. and in contact with a palladium catalyst in an acidic medium having a pH less than 2, the dilactone [Δ$^{2,2'(5H,5'H)}$-bifuran]-5,5'-dione.

4. Process for preparing 4-ketosuberic acid as set forth in claim 3 whereby said acidic medium having a pH less than 2 contains concentrated hydrochloric acid.

5. Process for preparing 4-ketosuberic acid which comprises hydrogenating, at a temperature of 20 to 25° C. under a hydrogen pressure within the range of atmospheric to 1000 lbs./sq. in. and in contact with a palladium-on-charcoal catalyst in an acidic medium of acetic and hydrochloric acids having a pH less than 2, the dilactone [Δ$^{2,2'(5H,5'H)}$-bifuran]-5,5'-dione.

6. Process for preparing 4-ketosuberic acid which comprises reacting hydrogen, in an acidic medium having a pH less than 2 and in contact with a palladium catalyst, with the dilactone having the formula

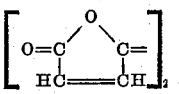

7. Process for preparing 4-ketosuberic acid as set forth in claim 6 wherein said acidic medium having a pH less than 2 contains concentrated hydrochloric acid.

8. Process for preparing 4-ketosuberic acid as set forth in claim 6 wherein said acidic medium having a pH less than 2 contains acetic acid and concentrated hydrochloric acid.

References Cited in the file of this patent
UNITED STATES PATENTS

| | | |
|---|---|---|
| 2,436,532 | Singleton | Feb. 24, 1948 |
| 2,484,499 | Hagemeyer | Oct. 11, 1949 |